United States Patent
Levijoki et al.

(10) Patent No.: US 10,151,251 B1
(45) Date of Patent: Dec. 11, 2018

(54) METHOD AND CONTROLLER FOR ENGINE TORQUE CONTROL IN A VEHICLE DURING A DEFAULT THROTTLE CONDITION

(71) Applicant: GM GLOBAL TECHNOLOGY OPERATIONS LLC, Detroit, MI (US)

(72) Inventors: Stephen P Levijoki, Swartz Creek, MI (US); Damon Grimwood, Berwick (AU); James L Worthing, Houghton Lake, MI (US)

(*) Notice: Subject to any disclaimer, the term of this patent is extended or adjusted under 35 U.S.C. 154(b) by 0 days.

(21) Appl. No.: 15/812,171

(22) Filed: Nov. 14, 2017

(51) Int. Cl.
F02M 9/02 (2006.01)
F02D 9/02 (2006.01)
F02D 11/10 (2006.01)

(52) U.S. Cl.
CPC ............. F02D 9/02 (2013.01); F02D 11/107 (2013.01); F02D 2009/023 (2013.01); F02D 2009/0289 (2013.01); F02D 2009/0296 (2013.01); F02D 2200/101 (2013.01); F02D 2200/1002 (2013.01); F02D 2250/24 (2013.01)

(58) Field of Classification Search
CPC ............. F02M 9/02; F02M 2009/023; F02M 2009/0289; F02M 2009/0296; F02D 2200/1002; F02D 2200/101; F02D 2250/24; F02D 11/107
USPC .................. 123/339.17, 398, 399, 400, 396
See application file for complete search history.

(56) References Cited

U.S. PATENT DOCUMENTS

| | | | |
|---|---|---|---|
| 5,492,097 A | 2/1996 | Byram et al. | |
| 5,629,852 A * | 5/1997 | Yokoyama | F02D 11/107 701/101 |
| 7,080,625 B2 | 7/2006 | Albertson et al. | |
| 8,406,954 B2 * | 3/2013 | Whitney | B60H 1/3205 123/339.17 |
| 8,798,856 B2 | 8/2014 | Major et al. | |
| 8,919,323 B2 | 12/2014 | Kar et al. | |
| 9,500,143 B2 | 11/2016 | Correia et al. | |
| 2003/0221668 A1 * | 12/2003 | Hashimoto | F02D 11/105 123/396 |
| 2008/0006236 A1 * | 1/2008 | Yamashita | F02D 41/021 123/198 R |

FOREIGN PATENT DOCUMENTS

JP 6109378 B1 * 4/2017 ............... F02M 9/02

OTHER PUBLICATIONS

JP 6109378 B1 (Hisatsune et al.) Apr. 5, 2017 (Machine Translation). [online] [retrieved on Jun. 22, 2018]. Retrieved from EPO Database.*

* cited by examiner

Primary Examiner — Mahmoud Gimie

(57) ABSTRACT

A method for controlling engine torque in a vehicle during a default throttle condition includes determining whether a throttle of the engine is in a default throttle condition, determining whether the engine is producing more torque than desired if the throttle of the engine is in the default throttle condition, and applying an accessory load to the engine if the engine is producing more torque than desired in the default throttle condition.

16 Claims, 3 Drawing Sheets

METHOD AND CONTROLLER FOR ENGINE TORQUE CONTROL IN A VEHICLE DURING A DEFAULT THROTTLE CONDITION

FIELD

The present disclosure relates to a method and controller for engine torque control in a vehicle during a default throttle condition.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Internal combustion engines combust an air and fuel mixture within cylinders to drive pistons, which produces drive torque. Air flow into the engine is regulated via a throttle. The throttle adjusts a throttle position, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Electronic throttle control systems have been developed to control a throttle valve position or area to achieve a desired torque. Many of these valves are motor actuated blade or butterfly valves having a valve default position which is a balance point of opposed mechanical springs that bias the valve blade such that the throttle maintains a default position when not acted upon by a throttle actuator. In this manner, when a throttle actuator may fail to operate or may be disabled, the throttle maintains a default throttle position and provides a limited air flow which may be sufficient to permit continued, but limited, operation of the engine.

SUMMARY

In an exemplary aspect, a method for controlling engine torque in a vehicle during a default throttle condition includes determining whether a throttle of the engine is in a default throttle condition, determining whether the engine is producing more torque than desired if the throttle of the engine is in the default throttle condition, and applying an accessory load to the engine if the engine is producing more torque than desired in the default throttle condition.

In this manner, engine torque and speed may be controlled even in a default throttle condition.

In another exemplary aspect, applying an accessory load to the engine if the engine is producing more torque than desired in the default throttle condition includes determining whether an air conditioning system compressor coupled to a crankshaft of the engine is activated, and activating the air conditioning compressor if the air conditioning compressor is not activated.

In another exemplary aspect, applying an accessory load to the engine if the engine is producing more torque than desired in the default throttle condition includes determining whether an alternator coupled to a crankshaft of the engine is activated, and activating the alternator if the alternator is not activated.

In another exemplary aspect, determining whether the engine is producing more torque than desired if the throttle of the engine is in the default throttle condition further includes determining whether an operating speed of the engine exceeds a predetermined idle speed.

In another exemplary aspect, the method further includes determining whether the engine is producing less torque than desired, and disengaging the accessory load from the engine if the engine is producing less torque than desired.

In another exemplary aspect, determining whether the engine is producing less torque than desired includes determining whether an operating speed of the engine is lower than a predetermined minimum speed.

In another exemplary aspect, the predetermined minimum speed is an engine stall speed.

In another exemplary aspect, applying an accessory load to the engine if the engine is producing more torque than desired in the default throttle condition includes determining whether an alternator coupled to a crankshaft of the engine is activated, and increasing an alternator charging level if the alternator is activated.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
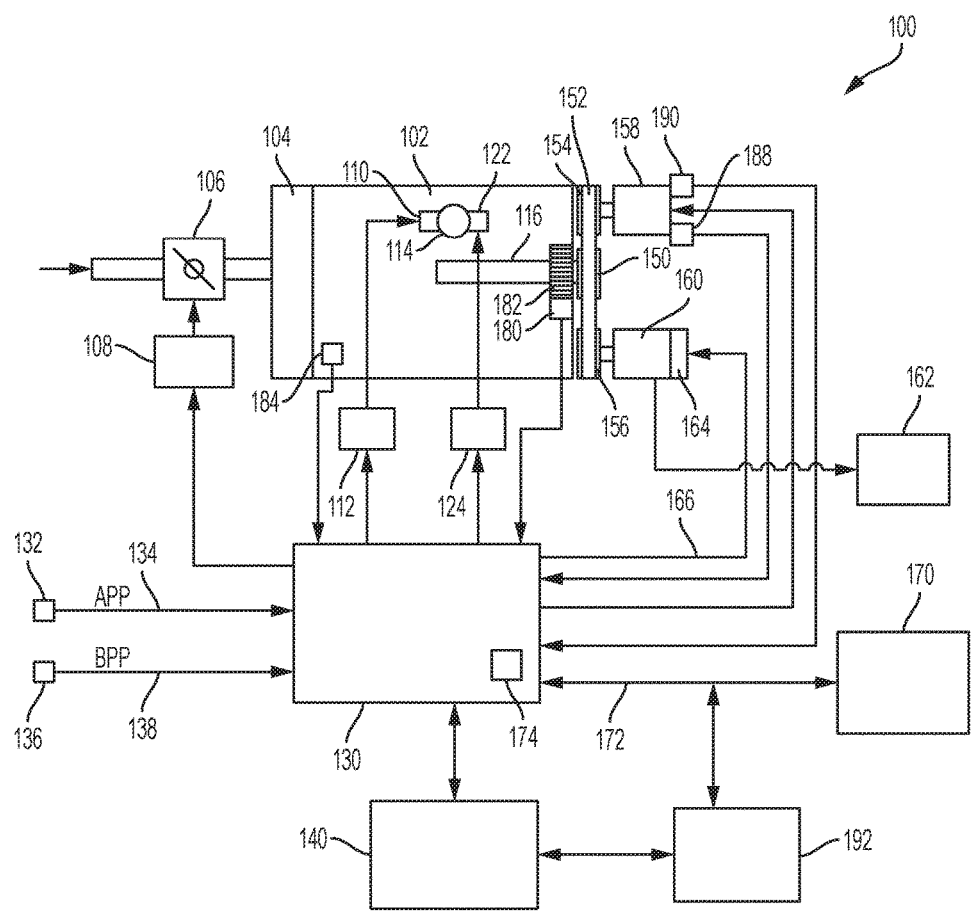
FIG. 1 is a schematic illustration of an exemplary vehicle system 100 for a vehicle in accordance with the present disclosure.

Referring now to FIG. 1, a schematic illustration of an exemplary vehicle system 100 for a vehicle is presented. An engine 102 generates torque for the vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injectors.

A cylinder 114 includes a piston (not shown) that is coupled to a crankshaft 116. Although the engine 102 is depicted as including only the cylinder 114, the engine 102 may include more than one cylinder. The fuel injectors may inject fuel directly into the cylinders or at another suitable location. One combustion cycle of the cylinder 114 may include four strokes: an intake stroke, a compression stroke, an expansion stroke, and an exhaust stroke. During one revolution of the crankshaft 116 (i.e., 360 degrees of crankshaft rotation), two of the four strokes may occur. One engine cycle may include each of the cylinders undergoing one combustion cycle. One engine cycle may occur over two revolutions of the crankshaft 116 (i.e., 720 degrees of crankshaft rotation).

During the intake stroke, the piston is lowered to a bottom most position, and air and fuel may be provided to the cylinder 114. The bottom most position may be referred to as a bottom dead center (BDC) position. Air enters the cylinder 114 through one or more intake valves (not shown) associated with the cylinder 114. One or more exhaust valves (not shown) are also associated with the cylinder 114. For purposes of discussion only, only one intake valve and one exhaust valve will be discussed.

During the compression stroke, the crankshaft 116 drives the piston toward a top most position. The top most position may be referred to as a top dead center (TDC) position. The intake valve and the exhaust valve are both closed during the compression stroke, and the piston compresses the contents of the cylinder 114. A spark plug 122 may ignite the air/fuel mixture during operation of the engine 102. A spark actuator module 124 controls the spark plug 122.

Combustion of the air/fuel mixture drives the piston back toward the BDC position during the expansion stroke. The piston drives the crankshaft 116. The rotational force (i.e., torque) on the crankshaft 116 from combustion of the air/fuel mixture may be a source of compressive force for a compression stroke of a combustion cycle of a next cylinder in a predetermined firing order of the cylinders. Exhaust resulting from the combustion of the air/fuel mixture is expelled from the cylinder 114 during the exhaust stroke. While the engine 102 is described as a four-stroke engine, the engine 102 may be another suitable type of engine.

An engine control module (ECM) 130 controls the throttle valve 106 via the throttle actuator module 108 and controls the fuel injectors via the fuel actuator module 112. The ECM 130 controls the spark plugs via the spark actuator module 124. The ECM 130 may also control one or more other engine actuators, such as one or more camshaft phasers, one or more valve lift actuators, one or more boost devices, an exhaust gas recirculation (EGR) valve, etc.

The ECM 130 may control the engine actuators to produce a target engine output. The ECM 130 may determine the target engine output, for example, based on one or more driver inputs. The driver inputs may include, for example, one or more accelerator pedal positions (APPs), one or more brake pedal positions (BPPs), cruise control inputs, and other suitable driver inputs.

An APP sensor 132 measures a position of an accelerator pedal (not shown) and generates an APP signal 134 based on the position of the accelerator pedal. A BPP sensor 136 measures position of a brake pedal (not shown) and generates a BPP signal 138 based on the position of the brake pedal. The accelerator pedal is in a resting position when the accelerator pedal is not being depressed by the driver. The brake pedal is in a resting position when the brake pedal is not being depressed by the driver.

The APP sensor 132 may set the APP signal 134 to an active state when the accelerator pedal is in the resting position and set the APP signal 134 to an inactive state when the accelerator pedal is not in the resting position. One or more other APP sensors may be provided. Another APP sensor may, for example, generate an APP signal based on how far the driver has depressed the accelerator pedal relative to the resting position. The BPP sensor 136 may set the BPP signal 138 to an active state when the brake pedal is in the resting position and set the BPP signal 138 to an inactive state when the brake pedal is not in the resting position. One or more other BPP sensors may be provided.

The engine 102 outputs torque to a transmission (not shown) via the crankshaft 116. In implementations where the transmission includes an automatic transmission, a clutch to clutch transmission, a dual clutch transmission, or another type of non-manual transmission, a transmission control module (TCM) 140 controls operation of the transmission.

The TCM 140 may control, for example, engagement and disengagement of one or more torque transfer devices of the transmission, such as clutches, bands, etc. The TCM 140 may also control engagement and disengagement of a torque converter clutch in transmissions including a torque converter. The TCM 140 and the ECM 130 may share data. For example only, the TCM 140 may transmit a transmission state to the ECM 130. The transmission state indicates whether the engine 102 and the transmission are coupled or decoupled.

In implementations where the transmission is a manual transmission, the driver may actuate a clutch pedal to couple/decouple the engine 102 to/from the transmission. One or more clutch pedal position (CPP) sensors may measure a position of the clutch pedal and generate CPP signals based on the position of the clutch pedal.

A crankshaft pulley 150 is attached to and rotates with the crankshaft 116. A belt 152, chain, or other suitable device encircles the crankshaft pulley 150 and one or more other pulleys. For example only, the belt 152 encircles an air/conditioner (A/C) pulley 154 and an alternator pulley 156 in FIG. 1 and may encircle one or more other pulleys. The crankshaft pulley 150 drives the belt 152, and the belt 152 drives the A/C pulley 154 and the alternator pulley 156.

The A/C pulley 154 is coupled to an A/C shaft (not numbered) that is selectively coupled to an A/C compressor 158 via an A/C compressor clutch (not shown). The ECM 130 may control engagement and disengagement of the A/C compressor clutch. When the A/C compressor clutch is engaged, the engine 102 drives the A/C compressor, and the A/C compressor imposes a torque load on the engine 102.

The alternator pulley 156 is coupled to an alternator shaft (not numbered) that is coupled to an alternator 160. Based on current through windings of the alternator 160, the alternator 160 converts mechanical energy (i.e. torque) from the engine 102 into electrical energy. Electrical energy output by the alternator 160 may be stored in a battery 162. One or more electrical components of a vehicle may draw electrical energy for operation.

A regulator 164 controls current through the windings of the alternator 160 based on a commanded voltage 166 for an L-terminal of the alternator 160. The regulator 164 may apply a PWM signal to the L-terminal of the alternator 160 based on the commanded voltage 166. More specifically, the regulator 164 may determine a duty cycle for the PWM signal as a function of the commanded voltage 166 and apply the PWM signal (at the duty cycle) to the alternator 160.

A body control module (BCM) 170 generates a BCM desired voltage 172. The BCM 170 may generate the BCM desired voltage, for example, based on a state of charge (SOC) of the battery 162, present electrical loads, and/or one or more other suitable parameters. A voltage command module 174 generates the commanded voltage 166 based on the BCM desired voltage 172 and/or one or more other parameters.

A crankshaft position sensor 180 monitors an N-toothed wheel 182 and generates a crankshaft position signal based on rotation of the N-toothed wheel 182. For example only, the crankshaft position sensor 180 may include a variable reluctance (VR) sensor or another suitable type of crankshaft position sensor. The N-toothed wheel 182 rotates with the crankshaft 116.

An oil temperature (OT) sensor 184 measures a temperature of engine oil and generates an OT signal based on the temperature of the engine oil. An engine coolant temperature (ECT) may be implemented to measure a temperature of engine coolant and generate an ECT signal accordingly. The A/C compressor 158 may include a variable position pump. A pump position sensor 188 may measure a position of the variable position pump and generate a pump position signal based on the position. A pressure sensor 190 may measure pressure of refrigerant output by the A/C compressor and generate a pressure signal based on the pressure of the pressure. One or more other sensors may also be implemented.

The exemplary vehicle system 100 may further include additional accessory loads 192 which may also consume energy and, directly or indirectly, draw that energy from the engine 102. The additional accessory loads 192 may be in communication with one or more controllers, such as, for example, the engine control module 130, the transmission control module 140, and/or the body control module 170. For purposes of the present disclosure accessory loads may be defined as any load on the engine, either direct or indirect, which consumes or expends energy for a purpose other than propelling the vehicle. Accessory loads may include, for example, the A/C compressor 158, the alternator 160, and the like without limitation.

It is also to be understood that the electrical system (not shown) of the vehicle may include multiple devices which may demand power and which may, as a result, demand and/or consume energy from the engine via the alternator 160 and that activating any of these electrical devices may place an additional demand on the electrical system which may only be satisfied by the engine producing sufficient additional torque to drive the alternator 160. An example of such a device may include an electric rear window defrost system which may place a significant demand upon the electrical system for additional electrical current which may only be satisfied by the engine producing enough additional torque to the alternator to provide the additional current.

Similarly, it is to be appreciated that the A/C compressor 158 may form a portion of a heat transfer system (not shown) in the vehicle which may include multiple heat exchangers which may consume energy that is supplied from the A/C compressor 158 and which originates from torque supplied by the engine to the A/C compressor. In this manner, any demand for energy by the vehicle heat transfer system must ultimately be satisfied by torque generated by the engine through the A/C compressor. For example, a passenger cabin in the vehicle may include an air conditioning system which relies upon the A/C compressor to supply the energy to drive the air conditioning system. That energy must originate from torque supplied by the engine to the A/C compressor.

As explained previously, under certain conditions where, for example, a throttle control failure has been detected, the throttle actuator module 106 may be disabled such that it no longer adjusts the throttle opening. In this situation, a throttle valve blade 200 (see FIG. 2) in the throttle 106 resorts to a default position that may be determined by one or more mechanical springs biasing the valve blade into that default position. In this manner, a failure or loss of the ability to control the throttle 106 does not prevent the continued flow of at least a minimum amount of air flow through the throttle such that operation of the engine may continue.

Figure 2:
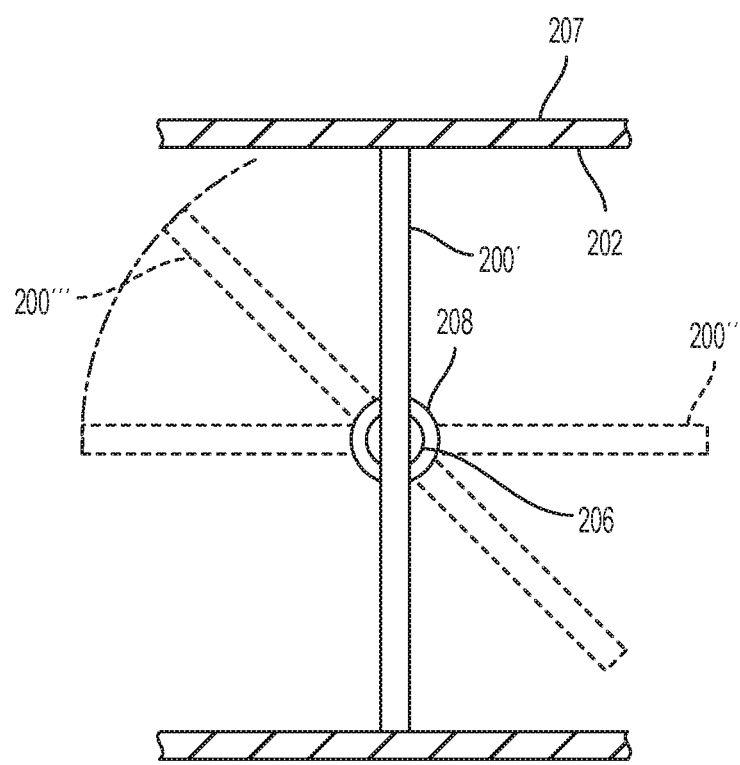
FIG. 2 is a cross-sectional side view of a throttle body.

Conventionally, with engines having larger displacements and correspondingly relatively large throttle valves, it has been relatively easy to select a default position which provides an amount of air flow which is sufficient for the engine to provide enough torque to move the vehicle, without having a situation in which too much air flow is provided which might cause the engine to run at speed which is higher than desired and/or provide more torque than desired. Referring to FIG. 2, a throttle valve blade 200 is positioned in a throttle passage 202 of a throttle body 207 and may rotate approximately 90 degrees between a completely closed throttle position 200' to a completely open throttle position 200". The throttle valve blade 200 is rotatable about an axis defined by a shaft 206. The throttle valve blade position 200 is defined by an angle between the closed position indicated at 200' toward the fully opened position 200". Under normal operation, an actuator (not shown) is controlled by the throttle actuator module 108 to rotate the throttle valve blade 200 to a desired or target opening angle. However, in the event of a fault where the actuator and/or the actuator module is not controlling the position of the throttle valve blade position, opposing biasing members 208 mounted on the shaft 206 may bias the throttle valve blade to a default position 200'''. The throttle valve blade default position may vary between different engine or throttle designs and is indicated at the position of throttle blade 200'''. For large displacement engines, and because of the correspondingly relatively large size of the throttle body 204, a relatively low opening angle for the default position may be selected which provides enough air flow to continue running the engine without providing too much air flow.

In stark contrast, for reduced displacement engines, the overall size of the throttle body 207 may be reduced in comparison with larger displacement engines. The present inventors have realized that with the continuing trend for reduced displacement engines, if the same opening angle is selected for the throttle valve for reduced displacement engine as for a conventional larger engine, the amount of air flow through the smaller throttle body may not be sufficient to provide a desired amount of minimum engine torque from the reduced displacement engine. For example, in a fault condition where throttle control may be lost and the throttle may enter into a default throttle condition, it is desirable to ensure that enough engine torque is available to move the vehicle to a more preferable location, even if at a slow speed. In order to enable sufficient engine torque for such a maneuver, the opening angle for the throttle valve in a throttle of a reduced displacement engine may have to be increased. For example, while a default opening angle for a conventional, relatively larger displacement engine may have been selected to correspond to a 30 degree opening angle, in order to provide a minimum desired amount of engine torque from a reduced displacement engine having a smaller throttle may require a larger, 45 degree opening angle for a default valve position.

The present inventors have also observed the continuing trend not only toward reduced displacement engines, but have also observed the trend of boosting those reduced displacement engines to enhance their torque capacity. Boosting an engine refers to compressing the air entering the engine to a higher pressure which provides more air mass for combustion and which, in turn, enables an engine to produce more torque than would have been possible in the absence of boost. Therefore, the ability of boost to improve the torque capacity of an engine has further enabled the reduction in displacement of engines while providing the same amount of torque. However, a boosted engine is more sensitive to the air flow passing through the throttle body. For example, in an engine having a turbocharger, enough air flow must be provided to the engine which is sufficient for that engine to generate enough enthalpy to drive the turbine of the turbocharger before the compressor of the turbocharger is able to develop enough compression in the incoming air flow to enable the engine to operate at an optimum level such that it is capable of producing sufficient torque. Therefore, it becomes more important to ensure an adequate supply of air flow through the throttle body as engine displacements are reduced and as these reduced displacement engines are boosted. This requires larger default throttle positions to provide sufficient air flow than has conventionally been required of larger displacement and/non-boosted engines in order to achieve a minimum desired torque capacity. However, the present inventors have realized that a larger default throttle opening may cause other problems.

While a larger default throttle position may be necessary to ensure sufficient torque for a reduced displacement engine, especially if boosted, for certain conditions that larger opening may permit more air flow than desired in other conditions. For example, a larger default throttle position may provide more air flow than required to maintain a desired idle speed. Thus, this may result in a higher than desired engine speed. For example, an engine may typically operate at an idle speed of between about 600-800 revolutions per minute and a reduced displacement and boosted engine may be receiving an air flow in a default throttle condition which causes that engine to idle at a speed of about 3000 revolutions per minute. These excess idle speeds may increase the wear on the engine components, and increase the level of noise and vibrations to higher than desired. Further, higher than desired engine speeds may also result in more engine torque being generated than otherwise desired. While increasing the default throttle position solves the problem of providing a sufficient minimum torque, the amount of torque generated is at a higher risk exceeding a desired torque.

In accordance with an exemplary embodiment of the present disclosure, in response to an over torque and/or over speed condition, an accessory load may be activated which provides an additional torque load on the engine which may then reduce the engine speed and torque to a more preferable lower level. For example, the vehicle system 100 may activate the A/C compressor, the alternator, or other accessory load in order to increase the load torque on the engine. In this manner, engine torque during a default throttle condition may be improved.

Conventionally, it is known to control engine torque by managing spark, fuel and other engine actuators. However, the ability of those conventional methods to control engine torque may be limited by the amount of air flow passing through the throttle in a default throttle condition. For example, cylinders may be completely deactivated and spark retarded, but the engine may still make more torque than desired due to the airflow in a default throttle condition.

Figure 3:
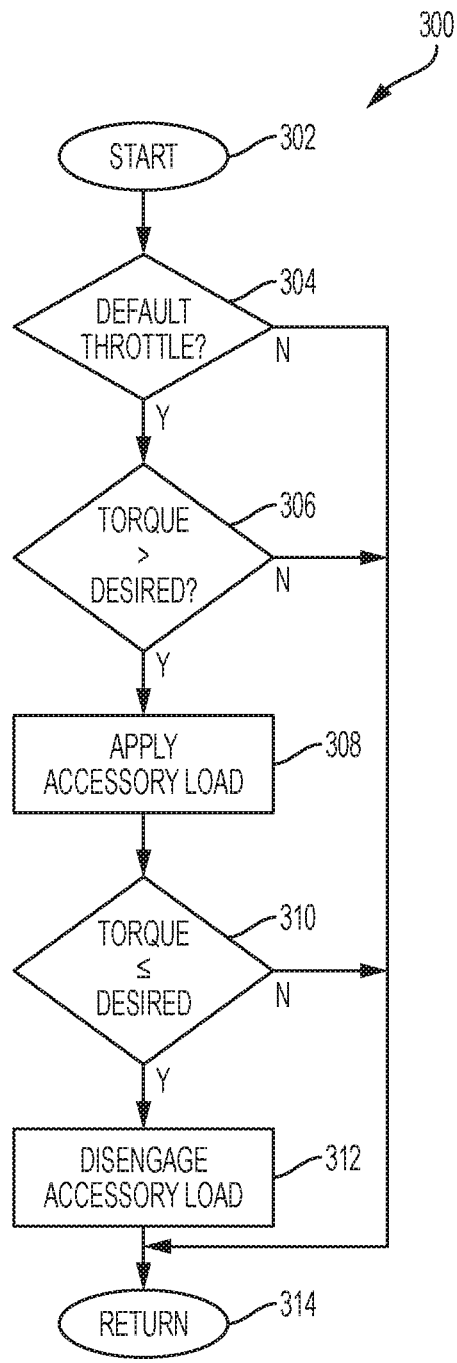
FIG. 3 is a flowchart of an exemplary method in accordance with the present disclosure.

FIG. 3 is a flowchart 300 of an exemplary method in accordance with the present disclosure. The method starts at step 302 and continues to step 304. In step 304, a controller determines whether a default throttle condition is active. If, in step 304, the controller determines that a default throttle condition is active, then the method continues to step 306. In step 306, the controller determines whether the engine is producing more torque than desired. If, in step 306, the controller determines that the engine is producing more torque than desired, then the controller continues to step 308. The determination may be based upon a comparison between the amount of torque which is actually being produced by the ending and that which is desired. The desired torque may be based upon any number of factors without limitation, such as, for example, an accelerator pedal position, a torque request from the transmission control module, and the like. In step 308, the controller applies an accessory load torque by activating an accessory load such as, for example, the A/C compressor, the alternator, or the like. The method then continues to step 310, where the controller determines whether the engine is producing less torque than desired. If, in step 310, the controller determines that the engine is producing less torque than desired, then the method continues to step 312. In step 312, the controller may then disengage the accessory load that was activated in step 308. The method then continues to step 314 where the control returns to the start 302. If, the determination made by the controller in any of the steps 304, 306, 310, and 312 are false, then the method jumps to step 314.

In an alternative exemplary method, the controller may determine whether an accessory load is already active or not and the level of that activation and make adjustments to the level of activation based upon multiple different indications. Further, the exemplary method may be further modified to gradually increase and/or decrease the number of accessory loads which are being applied to the engine. The method may rely upon a controller referring to a table storing a set of calibrated accessory loads according to specifically identified conditions and engine over torque amounts.

Further, while the present detailed description described an exemplary condition in which a speed ratio may have been drifting upwardly, it is to be understood that the control system and method of the present disclosure is also applicable to a condition in which the speed ratio may be drifting downwardly. Adjustments to the control system and method to address this other condition will be understood by those of ordinary skill in the art with reference to the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling engine torque in a vehicle during a default throttle condition, the method comprising:
   determining whether a throttle of the engine is in a default throttle condition;

determining whether the engine is producing more torque than desired if the throttle of the engine is in the default throttle condition;

applying an accessory load to the engine if the engine is producing more torque than desired in the default throttle condition;

determining whether the engine is producing less torque than desired; and disengaging the accessory load from the engine if the engine is producing less torque than desired.

2. The method of claim 1, wherein applying an accessory load to the engine if the engine is producing more torque than desired in the default throttle condition comprises:

determining whether an air conditioning system compressor coupled to a crankshaft of the engine is activated; and activating the air conditioning compressor if the air conditioning compressor is not activated.

3. The method of claim 1, wherein applying an accessory load to the engine if the engine is producing more torque than desired in the default throttle condition comprises:

determining whether an alternator coupled to a crankshaft of the engine is activated; and activating the alternator if the alternator is not activated.

4. The method of claim 1, wherein determining whether the engine is producing more torque than desired if the throttle of the engine is in the default throttle condition further comprises determining whether an operating speed of the engine exceeds a predetermined idle speed.

5. The method of claim 1, wherein determining whether the engine is producing less torque than desired comprises determining whether an operating speed of the engine is lower than a predetermined minimum speed.

6. The method of claim 5, wherein the predetermined minimum speed comprises an engine stall speed.

7. The method of claim 1, wherein applying an accessory load to the engine if the engine is producing more torque than desired in the default throttle condition comprises:

determining whether an alternator coupled to a crankshaft of the engine is activated; and increasing an alternator charging level if the alternator is activated.

8. The method of claim 1, wherein determining whether the engine is producing more torque than desired if the throttle of the engine is in the default throttle condition comprises:

determining whether the engine is producing more torque than a first predetermined amount;

determining whether the engine is producing more torque than a second predetermined amount that is greater than the first predetermined amount;

and wherein applying an accessory load to the engine if the engine is producing more torque than desired in the default throttle condition comprises:

applying a first set of one or more accessory loads on the engine if the engine is producing more torque than the first predetermined amount; and applying a second set of one or more accessory loads on the engine if the engine is producing more torque than the second predetermined amount, and wherein the second set of one or more accessory loads is greater than the first set of one or more accessory loads.

9. An engine torque controller for a vehicle in a default throttle condition, wherein the controller is programmed to:

determine whether a throttle of the engine is in a default throttle condition;

determine whether the engine is producing more torque than desired if the throttle of the engine is in the default throttle condition;

apply an accessory load to the engine if the engine is producing more torque than desired in the default throttle condition;

determine whether the engine is producing less torque than desired; and disengage the accessory load from the engine if the engine is producing less torque than desired.

10. The controller of claim 9, wherein, in order to apply the accessory load, the controller is programmed to:

determine whether an air conditioning system compressor coupled to a crankshaft of the engine is activated; and activate the air conditioning compressor if the air conditioning compressor is not activated.

11. The controller of claim 9, wherein, in order to apply the accessory load, the controller is programmed to:

determine whether an alternator coupled to a crankshaft of the engine is activated; and activate the alternator if the alternator is not activated.

12. The controller of claim 9, wherein, in order to determine whether the engine is producing more torque than desired, the controller is programmed to determine whether an operating speed of the engine exceeds a predetermined idle speed.

13. The controller of claim 9, wherein, in order to determine whether the engine is producing less torque than desired, the controller is programmed to determine whether an operating speed of the engine is lower than a predetermined minimum speed.

14. The controller of claim 13, wherein the predetermined minimum speed comprises an engine stall speed.

15. The controller of claim 9, wherein, in order to apply the accessory load, the controller is programmed to:

determine whether an alternator coupled to a crankshaft of the engine is activated; and increase an alternator charging level if the alternator is activated.

16. The controller of claim 9, wherein the controller is programmed to:

determine whether the engine is producing more torque than a first predetermined amount;

determine whether the engine is producing more torque than a second predetermined amount that is greater than the first predetermined amount;

apply a first set of one or more accessory loads on the engine if the engine is producing more torque than the first predetermined amount; and apply a second set of one or more accessory loads on the engine if the engine is producing more torque than the second predetermined amount, and wherein the second set of one or more accessory loads is greater than the first set of one or more accessory loads.

* * * * *